United States Patent [19]

Olsen et al.

[11] 4,213,478

[45] Jul. 22, 1980

[54] TRANSDUCER ASSEMBLY PROVIDING PNEUMATIC OUTPUT PROPORTIONAL TO ELECTRICAL INPUT SIGNAL

[75] Inventors: Everett O. Olsen, Wrentham; Robert F. Estes, Foxboro; Paul W. Rezendes, New Bedford, all of Mass.; George F. Williams, Rumford, R.I.

[73] Assignee: The Foxboro Company, Foxboro, Mass.

[21] Appl. No.: 972,096

[22] Filed: Dec. 21, 1978

Related U.S. Application Data

[63] Continuation of Ser. No. 776,575, Mar. 11, 1977, abandoned.

[51] Int. Cl.[2] ........................ F15B 5/00; G05D 16/20

[52] U.S. Cl. .................................. 137/85; 91/375 R; 91/459

[58] Field of Search ................ 91/47, 387, 375 R, 385

[56] References Cited

U.S. PATENT DOCUMENTS

| | | | |
|---|---|---|---|
| 2,268,783 | 1/1942 | Tate | 91/47 |
| 2,310,298 | 2/1943 | Kuhl et al. | 91/47 |
| 2,789,543 | 4/1957 | Popowsky | 91/47 |
| 4,044,651 | 8/1977 | Warrick | 91/47 |
| 4,044,652 | 8/1977 | Lewis | 91/375 R |

FOREIGN PATENT DOCUMENTS 705702 3/1954 United Kingdom .

*Primary Examiner*—Paul E. Maslousky
*Attorney, Agent, or Firm*—Andrew T. Karnakis; Lawrence J. Dion, Jr.

[57] ABSTRACT

An electro-pneumatic current-to-position transducer includes an electric motor having a permanent magnet for a stator and spring restrained coil pivotally suspended about the magnet for a rotor. An input current to the coil induces a mechanical rotation of the coil about the magnet which is proportional to the applied current. Fastened to the coil for rotary movement therewith is a flapper positioned to cover the nozzle of a pneumatic circuit. As current is applied to the coil, the flapper moves toward the nozzle thereby changing the back pressure in the pneumatic circuit. This change in pressure is amplified, then sensed by appropriate pressure-responsive devices and subsequently fed back to a control lever on which the nozzle is mounted, thereby repositioning the nozzle so as to maintain an essentially constant separation between the flapper and the nozzle. The pressure signal developed by this pneumatic control circuit is proportional to the applied current, and can serve as a pneumatic output signal for any of various purposes. Two embodiments of the transducer are disclosed, one arranged to convert an input current signal into a corresponding pressure output; the other adapted to receive an electrical input for proportionally controlling the position of a process control valve stem.

14 Claims, 11 Drawing Figures

TRANSDUCER ASSEMBLY PROVIDING PNEUMATIC OUTPUT PROPORTIONAL TO ELECTRICAL INPUT SIGNAL

This is a continuation of application Ser. No. 776,575 filed Mar. 11, 1977, now abandoned.

BACKGROUND OF THE INVENTION

1. Field of the Invention

This invention relates to current-to-position transducers used in industrial process control instrumentation. More particularly, this invention relates to such transducers which are especially adapted to produce a corresponding pneumatic pressure output signal or proportionally control by pneumatic means the position of a driven element, for example process control valve stem.

2. Description of the Prior Art

The conversion of electric input signals, which represent various control variables, into pneumatic outputs that may be used as set-point inputs for pneumatically operated instruments or for directly positioning the stem of a valve is well known in the process control instrumentation art. Throughout the years, numerous instruments have been developed for these purposes.

In certain of the prior art instruments, the input electrical current is first converted into an equivalent force either by means of a voice coil or a flat armature torque motor. The resultant force is then balanced across a pivoted element by a bellows. A pneumatic flapper-nozzle system maintains the pivoted element at null by applying the required offsetting pressure to the bellows. Hence an equivalence is established between the input current and the output pressure.

This method of pneumatically generating an output signal by opposing torques is commonly referred to as a force-balance system. Such a system is characterized in that little palpable motion occurs among the various operative components (i.e., nozzle-flapper, pivoted element, and bellows). Typically the range of movement of these components is in the order of 0.001 inch. Instruments of this type are commercially available from The Foxboro Company (Model 69TA) and Fisher Governor Company (Type 546).

Notwithstanding prior development efforts represented by the marketing of numerous prior instruments in this field, these instruments have not been wholly satisfactory and are more costly to build. In particular, prior art instruments of the force-balance type possess limited flexibility for use in other process control applications.

SUMMARY OF THE INVENTION

The present invention overcomes many of the disadvantages and limitations of prior electro-pneumatic position transducers by providing an accurate and reliable device capable of withstanding the influence of adverse external factors, and yet simple and compact to offer extreme flexibility of operation for many varied applications. In one preferred embodiment of the present invention to be described in detail hereinbelow, the input current is applied to an electromechanical transducer comprising a simple motor having a permanent magnet for a stator and a spring restrained rotating coil for a rotor. The magnet is positioned within the confines of the coil which has a pair of flexures coupled thereto serving not only as a pivot allowing the coil to rotate about the magnet, but also as a spring restraining member to balance the torque generated by the input current. Therefore, an input current to the coil will induce a mechanical rotation of the coil about the central axis of the magnet which is proportional to the applied current.

Fastened to the coil for arcuate movement therewith is a flapper which is positioned so as to cover the nozzle of a pneumatic circuit. As current is applied to the coil, the flapper changes its angular position covering the nozzle and thereby changing the back pressure in the nozzle circuit. This pressure is amplified and then fed through appropriate feedback elements to a control lever on which the nozzle is mounted, such that the pressure signal generated by this nozzle-flapper interaction repositions the nozzle so as to maintain an essentially constant separation between the flapper and the nozzle. Although there is no physical contact between the flapper and the nozzle, the motion of the flapper produces a one-to-one follow-up movement of the nozzle which, in the case of this electro-pneumatic transducer, is proportional to the magnitude of input current applied. Thus this control circuit provides what is referred to as a motion-balance of the interrelated parts. The pneumatic back pressure developed by the nozzle is proportional to the applied input current, and can serve as a pneumatic output signal for any of various purposes.

The overall arrangement of the present invention combines high measurement accuracy, especially in the presence of shock and vibration, with a compact, symmetric construction that lends itself to economical manufacture and promotes increased flexibility of application.

By having the coil rotate within the peak flux areas of an intense magnetic field, linearity of output motion with respect to input current is enhanced, thereby further improving overall instrument accuracy.

Other objects, aspects and advantages of the present invention will in part be pointed out in and, in part, apparent from the following description considered with the accompanying drawings.

DESCRIPTION OF THE PREFERRED EMBODIMENT

Figure 1:
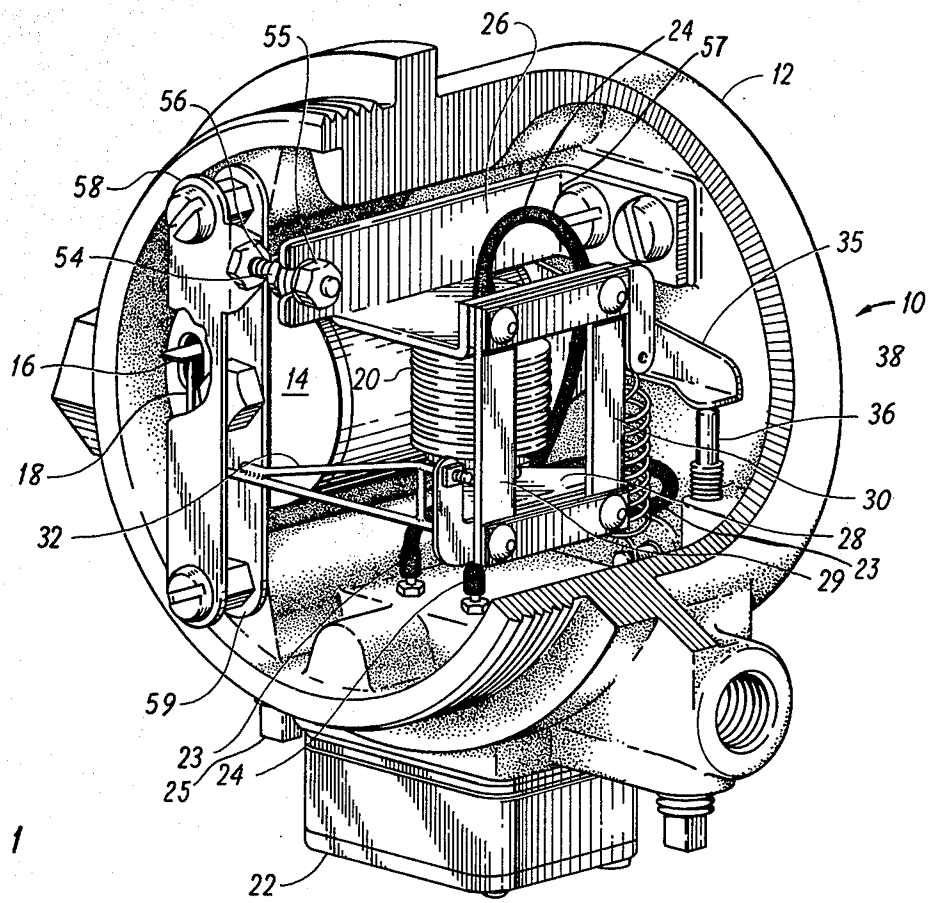
FIG. 1 is a perspective view, partially cut-away, of an electro-pneumatic current-to-position transducer embodying one form of the present invention.
Figure 2:
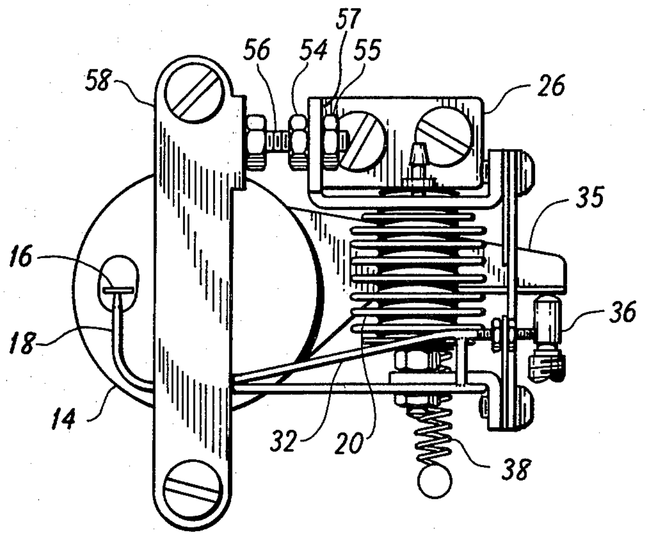
FIG. 2, is an end elevation view of the transducer of FIG. 1 with the instrument casing removed to more clearly present the relationship between operative components.
Figure 3:
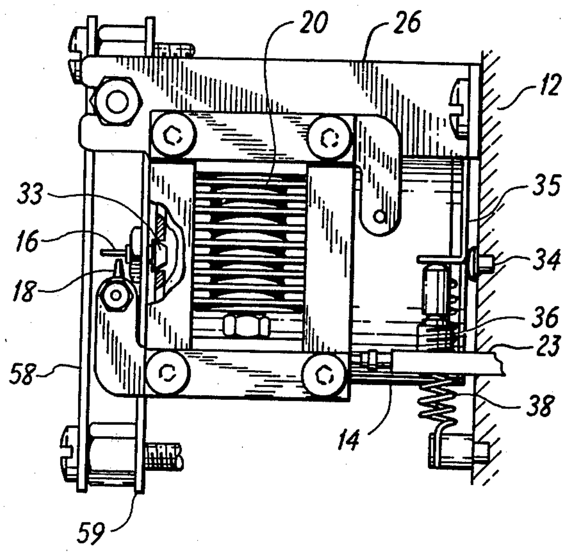
FIG. 3 is a side elevation view of the transducer of FIG. 1, again with the instrument case removed, showing details of the pneumatic feedback assembly.

Referring now to FIGS. 1–3, the electro-pneumatic current-to-position transducer 10 is shown to comprise a cylindrical instrument housing 12 to one end of which is fastened a motor 14. A flapper 16, which is positioned by the motor along an arcuate, but generally vertical path, covers the nozzle 18 of a pneumatic circuit that includes feedback bellows 20 and relay 22 which are joined in conventional fashion by conduits 23, 24. The bellows is rigidly secured to the housing at its upper end through a platform-bracket 26, while the lower end interacts with a nozzle control lever 28 which is supported for small pivotal movements by a pair of deformable leaf springs 29, 30. The nozzle is connected to the lever 28 through brace 32 such that as current is applied to the motor causing the flapper to move toward the nozzle, a corresponding increase in pressure is developed in the bellows producing a nozzle motion equivalent to that of the flapper and in the same direction.

Figure 4:
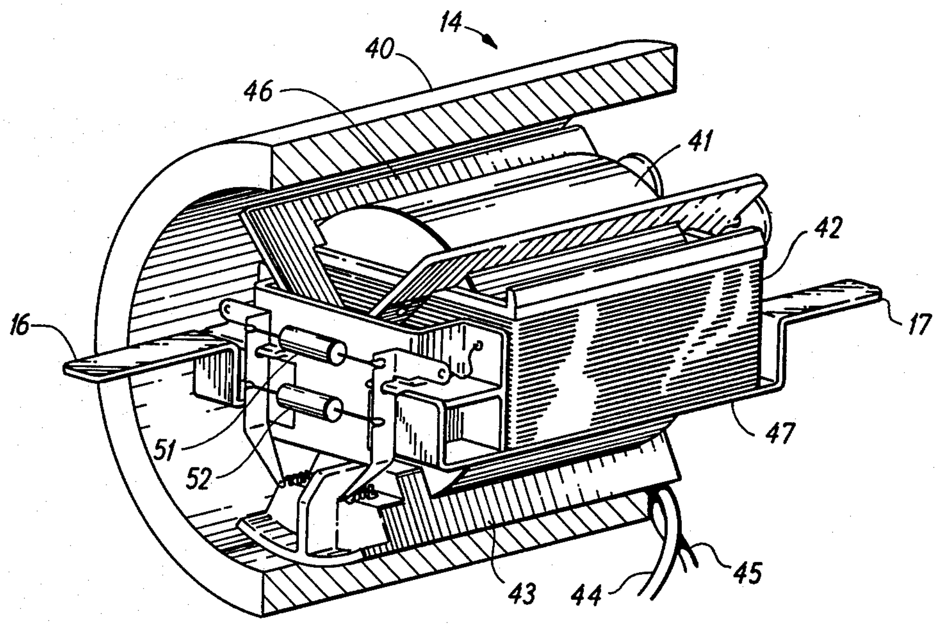
FIG. 4 is a perspective view, partially cut-away, of the motor assembly of the instrument.
Figure 5:
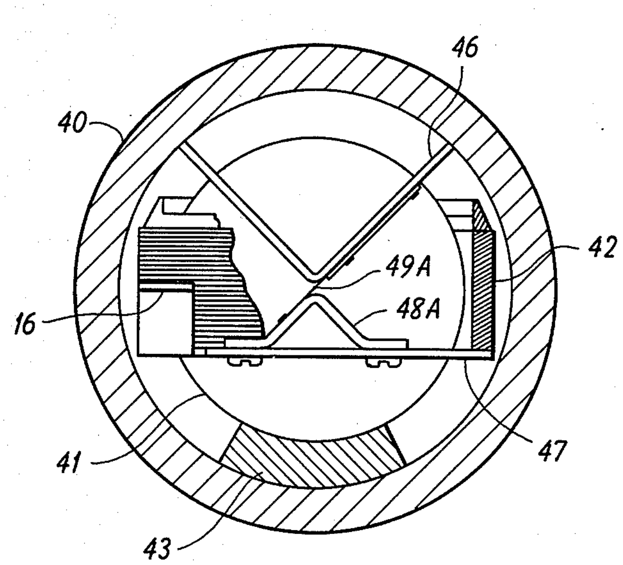
FIG. 5 is an elevation view, partly in section of the motor assembly of FIG. 4.
Figure 6:
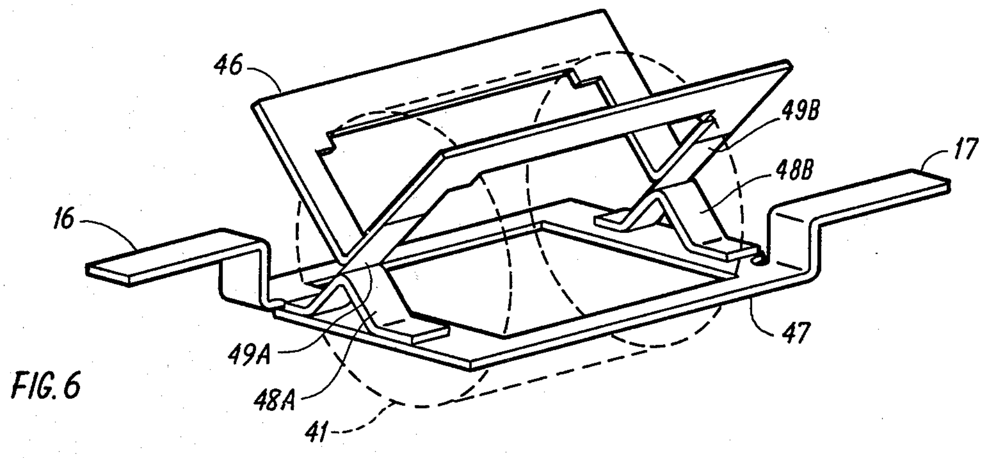
FIG. 6 is a perspective view of the suspension system for the motor assembly.

The motor 14 (see FIGS. 4–6) basically comprises a tubular casing 40 surrounding a cylindrical permanent magnet 41 and containing an elongate, generally rectangular coil 42 between the magnet and casing. Proper suspension of the coil will be discussed subsequently below. The magnet is secured along one edge to an electrical terminal block 43, which receives input current leads 44, 45. Proper positioning of the magnet within the tubular casing is assured by a right-angle bracket 46, which extends along the entire axis of the magnet to form a wedge between the magnet and the casing. In this manner, the coil may be allowed to rotate without contacting either the magnet or the casing. In order not to interfere with the magnet field distribution the terminal block and the right-angle bracket are formed from non-magnetic material.

The magnet 41 is magnetized along a diameter such that its north and south poles are diametrically opposed along the entire axis of the magnet. The tubular casing 40 is ideally formed of a soft ferrous material to provide a return path and hence intensify the magnetic field at the respective north and south poles. In addition, the casing shields the rotating coil-magnet assembly from the effects of external magnetic fields.

The long sides of the coil 42 serve as its operative sides and are thus positioned adjacent to the poles of the magnet such that the bulk of the magnetic field passes through these operative sides. To suspend the coil for proper rotation about the magnet 41 it is mounted on a frame 47 having V-shaped flexures supports 48A, 48B fastened to its opposite ends. The coil/frame assembly is then positioned around the magnet which rests on the terminal block 43. The right-angle bracket 46 is placed over the top portion of the magnet so as to provide a connection point for a pair of flexures 49A, 49B (one on either end of the coil). This entire sub-assembly is then inserted into the tubular casing 40, thereby suspending the coil in a manner which allows it to rotate about the magnet's axis of symmetry. Final alignment and securement is accomplished by tightening a set screw located in the casing (not shown) which engages the terminal block. Of course, the coil is carefully dimensioned to assure that it does not contact either the magnet or the tubular casing during rotation over the operative input span of the instrument.

The unique rotary configuration of the motor wherein the coil rotates externally with respect to the magnet offers several advantages. Such a balanced, symmetrical design affords minimum sensitivity to the adverse effects of external translation vibration resulting from imbalances associated with manufacturing and/or assembly tolorances. Moreover, the overall coil structure is exposed to a highly intense, uniform magnetic field for enhancing the rotational linearity response characteristics of the motor. Improvement in dynamic response is provided by mounting to the coil a copper conductor in the form of a shorted turn. This provides sufficient damping to minimuze "ringing" due to the sudden application of an electrical current input and external vibrational effects.

Returning now to the operation of the current-to-position transducer, a portion of the coil frame 47 near the periphery of the casing 40 is shown to extend laterally from both radial edges to form two flappers 16, 17. The purposes of this second, rearward extending flapper 17 will be discussed subsequently. When an input current of positive polarity is supplied to the coil 42, the resultant interaction with the magnetic field generates a torque which urges the coil to rotate clockwise until a balance of torque is achieved between the magnetic force generated and the restraining force supplied by the two flexures 49A, 49B. The resultant angular rotation is thus essentially proportional to the magnitude of the input current applied. Therefore, it is readily apparent that the pivot-flexure serves a dual purpose in suspending the coil about the magnet as well as in providing a closely controlled spring rate for establishing the magnitude of rotation. Over normal instrument operation range, angular rotation of the flapper is nominally 7 degrees.

In FIGS. 1–3, the current-to-position transducer is arranged to convert an electrical input into a corresponding pressure output. As the flapper 16 moves closer to the nozzle 18 due to the application of a current signal, the back pressure in the nozzle increases due to the flow restriction. This back pressure is conventionally amplified by relay 22 whose corresponding output pressure is and applied to feedback bellows 20 through conduit 24. Details of the relay and bellows combination, particularly how the relay operates to produce an output pressure signal that is proportional to the nozzle back pressure and of significantly higher magnitude, are disclosed in U.S. Pat. No. 2,658,392 issued on Nov. 10, 1953 to W. E. Vannah. An examination of FIG. 1 of the Vannah patent shows that the pressure input 32, nozzle connection conduit 27, output pressure passage 34 and 37, and feedback bellows 39 correspond to drawing reference numerals 25, 23, 24 and 20 respectively as shown in FIG. 1 of the present application. As previously discussed, the bellows is incorporated in a structure fastened to the instrument housing 12 which includes a spring restrained control lever 28 to which the nozzle is connected by a support brace 32.

When pressure in the bellows increases, the nozzle control lever 28 deflects against the restraining forces posed by leaf springs 29, 30 to move the nozzle in the same direction as (i.e., away from) the flapper until equilibrium is re-established. At the new equilibrium point, the increased bellows pressure is directly proportional to the input signal. Thus an increasing input current produces an increase in the output pressure developed in the bellows. As a typical example of an instrument embodying the principles of this invention suitable for use in industrial process control system, an input current of 4 to 20 milliamperes generates a corresponding output signal of 3 to 15 psi. The inclusion of diodes 51, 52 across the input terminals of the coil provides a current path for dissipating stored energy in the coil in the event of an open-circuited input signal, and thus assures intrinsic safety when the instrument is used in explosive environments.

The overall symmetrical construction of the transducer 10, and in particular the motor/flapper/nozzle rotary angular relationship, also affords simplicity in making accurate instrument adjustments. For adjusting the zero point of the instrument, the motor assembly is mounted on a pair of conical pivots 33, 34 (FIG. 3). A flange 35 is secured to the rear cover of the motor 14, and a spring loaded zero screw 36 acts on the flange. As the screw 36 is turned, the motor rotates on the pivots, resulting in corresponding movement of the flapper 16, which in turn produces a change in output pressure. A load spring 38 holds the motor adjustment. Thus, simply turning the zero screw will accurately produce a low pressure (zero) output (e.g., 3 psi) for a low current input (e.g., 4 ma.).

Any substantial change in the instrument range requires substitution of the leaf springs 29, 30 and/or the bellows 20 for others having a different spring rate. However, minor adjustments in span (i.e., the difference between the upper and lower output values for a fixed input) to compensate for tolerance variations during manufacturing may be easily performed in the factory and/or in the field. A pair of locking nuts 54, 55 on a jackscrew 56 rigidly secured between the platform bracket 26 and a span bracket 58, also attached to the instrument housing 12, provide for the entire bellows feedback assembly to be pivoted essentially parallel to the flapper 16. When the nuts are adjusted along the jackscrew, the platform bracket bends about a vertical axis (as viewed with respect to the orientation of FIG. 1) which passes through the right angle bend 57 of the bracket 26. This pivoting action moves the nozzle 18 across the flapper radially with respect to the pivot axis of the motor 14, while substantially maintaining a constant spacing between the nozzle and flapper. Such an adjustment thus changes the effective radius of rotation about the motor 14, and since the instrument relies on the balancing of motion of operative components, a change in span is effectuated as the lever-arm ratios between flapper and nozzle varies i.e., the nozzle has to move more or less for a given flapper movement. The use of a dual nut arrangement for locking purposes also provides additional bracing against vibration.

To demonstrate one facet of the increased flexibility of the transducer built in accordance with the present invention, the entire motor assembly may be removed from the instrument housing by disconnecting the jackscrew 56 from the platform bracket 26 and by removing the span bracket 58 and the galvo strap 59. The motor may then be reinserted in reverse such that the other flapper 17 covers the nozzle 18. Since this second flapper 17 is diametrically opposite the first flapper 16 and rotates about the same axis, an increasing current signal will move the flapper away from the nozzle, thereby decreasing the output pressure in the bellow. Whenever field applications warrant having an inverse relationship between input and output, this unique double ended motor configuration provides, by making a simple alteration, rotational reversal without reversing current polarity. Reversing current would require reversing the polarity of the diodes 51, 52 which would compromise their intrinsic safety value to the overall instrument. Of course, when the motor is removed in this manner, minor adjustments will most likely have to be made for zeroing and spanning the instrument as discussed above.

Referring now to FIGS. 7–11, there is shown an alternate embodiment of a current-to-position transducer adapted for controlling the position of a process control valve stem. A cursory review of these figures shows the striking similarity with the current-to-pressure converter of FIGS. 1–3. The overall instrument layout, particularly the motor which receives the input current signal are identical. Modest design changes to be discussed immediately below have been made to the feedback circuitry to accommodate controlling valve stem position. This further application of the unique design of the motor-flapper assembly demonstrates the wide-ranging flexibility of this overall configuration, as applied to the electro-pneumatic art.

Figure 8:
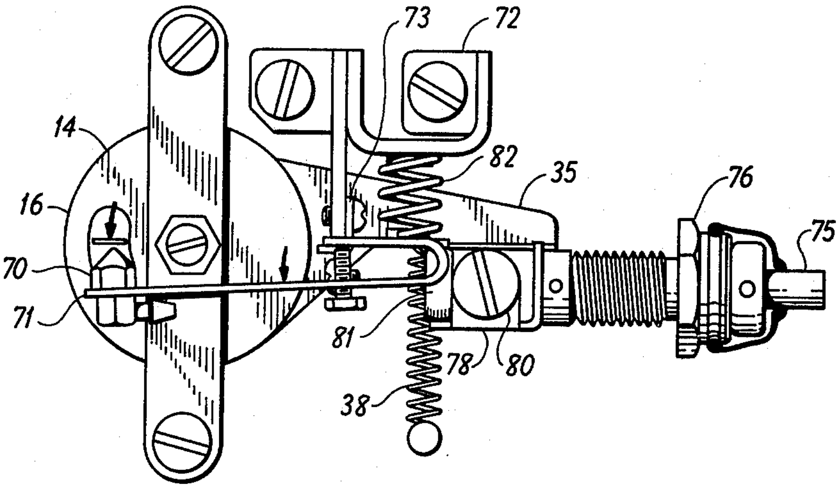
FIG. 8 is an end elevation view of the transducer of FIG. 7 with the instrument casing removed.
Figure 9:
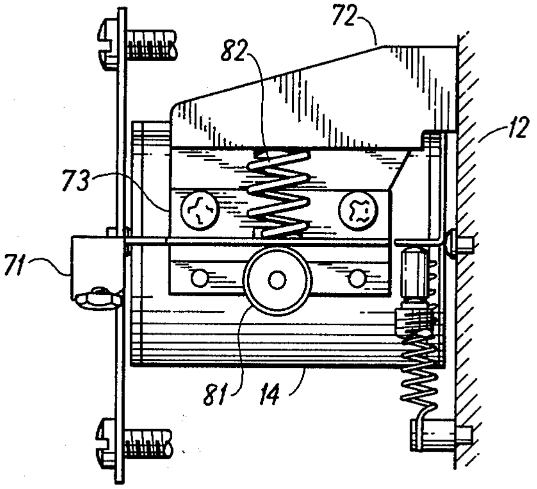
FIG. 9 is a side elevation view of the transducer of FIG. 7 without the instrument case showing details of the feedback assembly.
Figure 10:
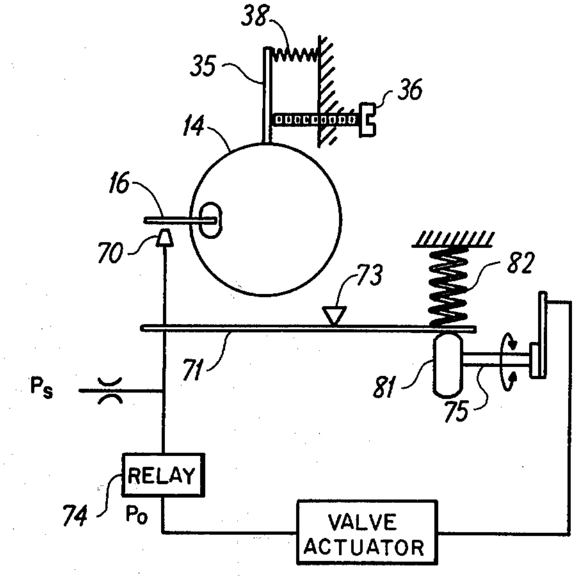
FIG. 10 is a schematic representation of the transducer of FIG. 7 showing a typical elements in the feedback circuit when the transducer is adapted to control the position of a valve.

As stated, the entire motor assembly 14 with its integral flapper 16 are as before; however, the nozzle 70 of the pneumatic circuit is mounted on an L-shaped feedback lever 71 pivotally connected to a housing mount 72 by means of a cross-flexure 73, arranged such that the pivot is perpendicular to the plane of FIG. 8. As current is applied to the motor, the flapper rotates to cover the nozzle creating a back pressure on the relay 74 (FIG. 10). A corresponding increase in the output pressure from the relay is applied to a valve actuator pressure chamber, causing valve stem motion. The valve actuator assembly per se is old in the art, and thus is not shown herein. Further descriptive information on the workings of valve actuators may be found in U.S. Pat. No. 2,661,725. Linear movement of the valve stem is converted in conventional manner, typically by a lever, to rotation of a position feedback shaft 75.

Figure 7:
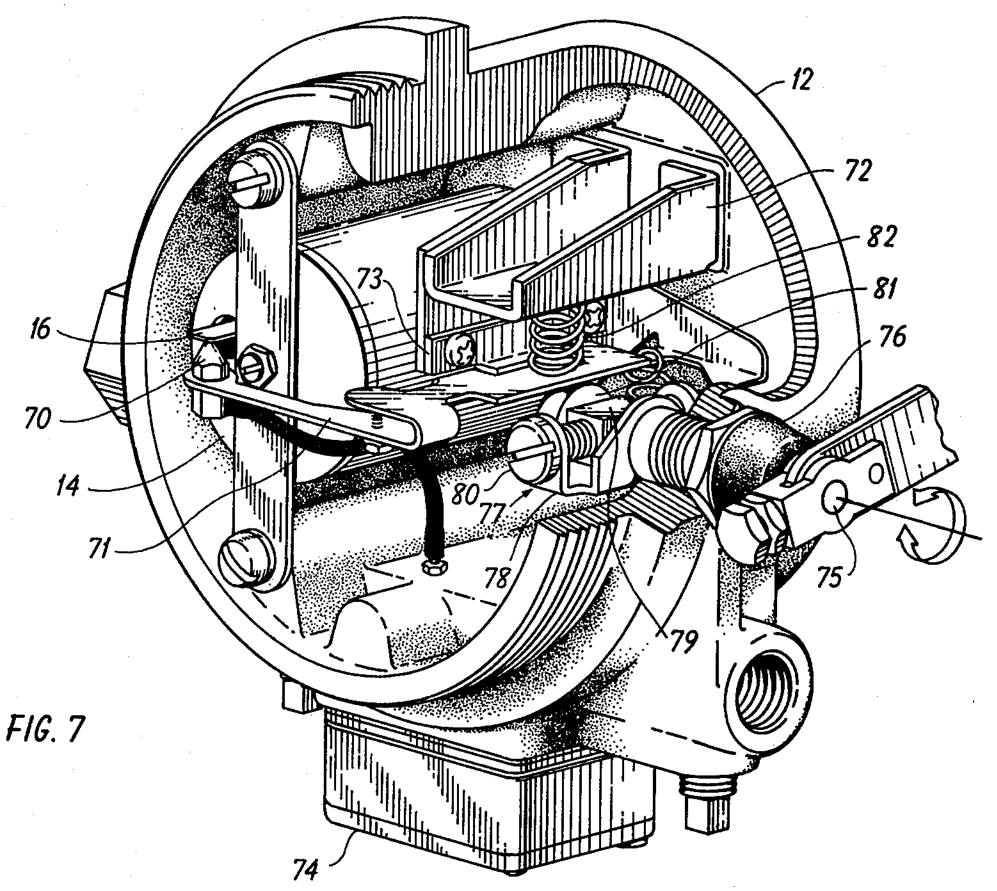
FIG. 7 is a perspective view, partially cut-away, of an alternate embodiment of the current-to-position transducer adapted for controlling the position of a valve stem.

The rotatable shaft 75 extends through the instrument housing 12 through a flame path bearing 76 where it is attached to an intermediate assembly 77. The intermediate assembly (FIG. 11) comprises a bracket 78 having one end fastened to the shaft and a roller 81 at the opposite end. The roller bears upon the lever 71 at a point which is offset laterally from the lever's pivot axis. A coiled spring 82 between the lever and the housing mount urges the lever against the roller over the operative span of the positioner. Thus as the shaft rotates, the intermediate assembly effectuates a conversion of the rotation into a vertical angular displacement of the nozzle. With the roller positioned as shown in FIG. 7 (i.e., roller offset laterally from the pivot toward the rear of the instrument), the rotation of the shaft produces displacement of the nozzle that follows the excursion of the flapper (see FIG. 8) until the system is rebalanced for the new current input, at which point the output pressure stabilizes and valve motion ceases. Therefore, by means of a position feedback shaft, a pivoted feedback lever, and other auxiliary levers, a current applied to the input of the transducer produces a proportional valve stem position.

Figure 11:
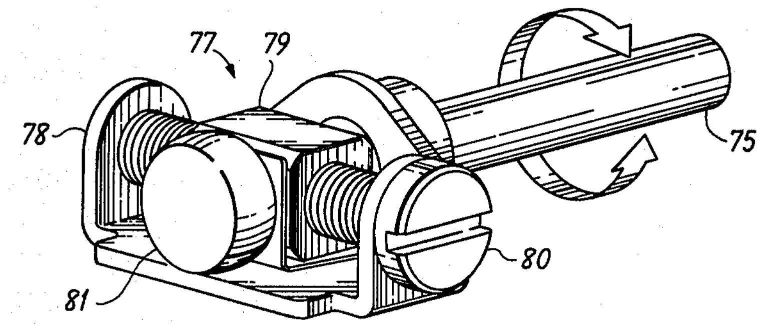
FIG. 11 is a perspective view of the range adjust mechanism of the transducer of FIG. 7.

As an indication of the flexibility of this embodiment of the present invention, reference is now made to FIG. 11 which shows the roller 81 rigidly fastened to a block 79 threaded on a lead screw 80. A simple adjustment of the lead screw changes the contact point of the roller and the lever 71, and thus varies the ratio between rotation of the position feedback shaft 75 and the angular displacement of the nozzle 70. Such an adjustment permits an accommodation of variation in valve stem travel for the same motor movement. In fact, if the point of bearing is moved to the opposite side of the pivot point (i.e., toward the front of the instrument), a reversal of valve stroke direction relative to output pressure may be accommodated without reversal of current polarity.

Zero adjustment of this embodiment is accomplished in the same manner as for the transducer shown in FIG. 1.

Although several embodiments of the present invention have been set forth in detail above, this is solely for the purpose of illustrating the principles of the invention, and should not be considered as limiting, for modifications may be made by those skilled in the art without departing from the spirit of and scope of the invention as set forth in the accompanying claims.

We claim:

1. A current to pneumatic output pressure transducer comprising:

a housing;

a casing of magnetically soft ferrous material mounted within said housing;

a permanent magnet having opposed north and south poles, said magnet being rigidly mounted within said casing and spaced therefrom;

a coil pivotally suspended within said casing within the field of said magnet and rotatable thereabout in the space between said magnet and said casing;

a flapper mounted on said coil at a point radially offset from the rotational axis thereof to produce arcuate movement of said flapper with rotary motion of said coil;

means for applying an electrical input current to said coil thereby inducing an angular rotation of said coil and said flapper, the angular position thereof being proportional to the magnitude of said applied current;

a shiftable support pivotally mounted on said housing adjacent said casing;

a pneumatic nozzle mounted on said support and located in close proximity to said flapper so that said nozzle may be covered by said flapper so as to generate a back pressure;

a pneumatic relay receiving the back pressure of said nozzle to produce a corresponding amplified output pressure signal;

a bellows receiving said output pressure signal for applying a pneumatic feedback force to said shiftable support;

spring means coupled to said shiftable support, the restraining forces of said spring means producing a change in position of said nozzle that corresponds essentially linearly with the movement of said flapper, whereby said output pressure signal is proportional to said applied input current.

2. An electro-pneumatic transducer assembly comprising:

a motor adapted to receive an input current and having a rotatable output member;

force restraining means opposing the movement of said output member and arranged to maintain the resultant angular rotation thereof at a position corresponding to the magnitude of the input current;

a pneumatic flapper/nozzle one element of which is mounted on said motor output member at a position radially-offset from the rotational axis thereof, thereby to effect arcuate motion of said one element with rotary motion of said output member;

a shiftable support carrying the other element of said flapper/nozzle to permit movement of said other element over a range corresponding to that of said one element;

a pneumatic relay receiving the back pressure of said nozzle to produce a corresponding amplified output pressure signal;

a bellows receiving said output pressure signal for applying a pneumatic feedback force to said shiftable support;

spring means coupled to said shiftable support, the restraining forces of said spring means producing a change in position of said other element that corresponds essentially linearly with the movement of said one element, whereby said output pressure signal is proportional to said applied input current.

3. Apparatus as claimed in claim 2, wherein said spring means comprises leaf springs mounted in cantilever fashion to said shiftable support to provide for small pivotal movement of said support when said feedback force is applied thereto.

4. Apparatus as claimed in claim 3 including a generally rigid but deformable support structure fastened to the end of said bellows remote from said shiftable support;

said structure providing support for said spring means and arranged to be substantially parallel to said shiftable support;

means connected to said support structure for varying the effective radius of rotation about said motor while maintaining a constant spacing between said flapper and nozzle, whereby an adjustment in span of said transducer assembly is effectuated.

5. Apparatus as claimed in claim 4 wherein said lever-arm ratio varying means comprises a jackscrew orthogonally connecting said support structure to said transducer;

said jackscrew including a first adjustable nut arranged to bend said support structure to produce a parallel shift in the effective radius of said flapper/-nozzle, and a second adjustable nut arranged to lock said shift in radius thereby minimizing the effect of vibration on said span adjustment.

6. Apparatus as claimed in claim 2 wherein said motor comprises a casing of magnetically soft ferrous material;

a cylindrical permanent magnet having diametrically opposed north and south poles extending along its length, said magnet being fixedly mounted within said casing and spaced therefrom;

said output member comprising a coil pivotally suspended within said casing surrounding said magnet and within the flux field thereof to permit rotation thereabout in response to flow of current in the coil.

7. Apparatus as claimed in claim 6 wherein said coil has its operative sides positioned adjacent the poles of said magnet and located within the bulk of the field produced thereby so as to provide effective linearity between the output motion and the input current.

8. Apparatus as claimed in claim 7 wherein said coil is elongate, said operative sides being the long sides thereof.

9. Apparatus as claimed in claim 6 wherein said coil is suspended at opposite ends by respective flexures providing a closely controlled spring rate for establishing the magnitude of angular rotation of said coil.

10. Apparatus as claimed in claim 6 including a copper conductor forming a shorted turn mounted to one edge of said coil to provide damping for improving the dynamic response of said transducer.

11. Apparatus as claimed in claim 6 wherein the flapper element is mounted on one end of said coil and said nozzle is mounted on said shiftable support.

12. Apparatus as claimed in claim 11 including a second flapper mounted on the opposite end of said coil;

said second flapper being positioned to rotate about the same axis as said first-mentioned flapper but diametrically offset therefrom, whereby when said motor is mounted in reverse within said transducer said second flapper covers said nozzle and establishes an inverse relationship between input current and output position without having to change the polarity of said input current.

13. Apparatus as claimed in claim 11 wherein said motor has its opposite ends mounted on conical pivots to allow rotation thereof to provide for zero adjustment of said transducer.

14. Apparatus as claimed in claim 13 including a flange secured to one end of said motor;

a spring-loaded screw biased against said flange to rotate said motor and said first flapper as said screw is turned, whereby a change in said output pressure signal is produced for a fixed input current.

* * * * *